United States Patent
Kanou et al.

(12) 
(10) Patent No.: US 6,463,014 B1
(45) Date of Patent: Oct. 8, 2002

(54) REPRODUCING APPARATUS

(75) Inventors: Kohei Kanou; Minako Ishizuka, both of Kanagawa; Takahiro Sato; Masayuki Mizuki, both of Tokyo, all of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/236,073

(22) Filed: Jan. 25, 1999

(30) Foreign Application Priority Data

| Jan. 26, 1998 | (JP) | ................................. 10-012717 |
| Jan. 26, 1998 | (JP) | ................................. 10-012718 |
| Jan. 29, 1998 | (JP) | ................................. 10-017177 |
| Jan. 29, 1998 | (JP) | ................................. 10-017178 |

(51) Int. Cl.$^7$ ................................. G11B 5/09
(52) U.S. Cl. ................. 369/5; 369/47.23; 369/53.45
(58) Field of Search ............ 369/2, 4, 5, 47.16, 369/47.23, 47.35, 53.45, 47.2; 84/601, 602, 603, 604, 616, 622, 626, 627, 662, 663, 737, 738, 645; 381/83, 93

(56) References Cited

U.S. PATENT DOCUMENTS 5,367,117 A * 11/1994 Kikuchi ..................... 84/603

FOREIGN PATENT DOCUMENTS

JP 03066064 * 3/1991

* cited by examiner

Primary Examiner—Thang V. Tran
(74) Attorney, Agent, or Firm—Rader, Fishman & Grauer PLLC; Ronald P. Kananen, Esq.

(57) ABSTRACT

In a reproducing apparatus of the present invention, an input audio signal is divided into bands and an envelope value of each band is measured. Based on a change of the envelope value, a predetermined sound source is superimposed. Further, according to the envelope value of a reproduced audio signal, a tempo of reproduced music is detected and animation representation is changed in synchronism with the detected tempo. Further, a rhythm box is reproduced in synchronism with the detected tempo and a sound field is automatically selected corresponding to the detected tempo to perform synthesization.

4 Claims, 11 Drawing Sheets

FIG. 4

| Kind of Tone | Class |
|---|---|
| Tight kick<br>Loose snare<br>Open ⎫<br>Close ⎭ Hihat<br>Low ⎫<br>High ⎭ Tom<br>Side stick<br>Hand clap<br>Open ⎫<br>Close ⎭ Conga<br>Cabasa<br>Claves<br>High ⎫<br>Low ⎭ Cowbell<br>Tambourin<br>Techno kick<br>Low ⎫<br>High ⎭ Whistle<br>Scratch | Percussion Instrument Sound ⟵ 30 |
| Punch<br>Beep<br>Squeal<br>Clush | Effect Sound ⟵ 31 |
| Ha<br>Go<br>Hey<br>Aoh<br>Shout<br>Yeah<br>Hooo<br>Yah<br>Sexy | Voice Sound ⟵ 32 |

FIG. 6
(a) 30 Pattern
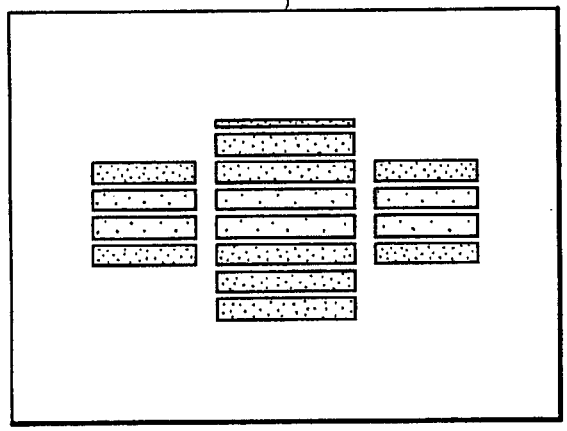
(b) 31 Pattern
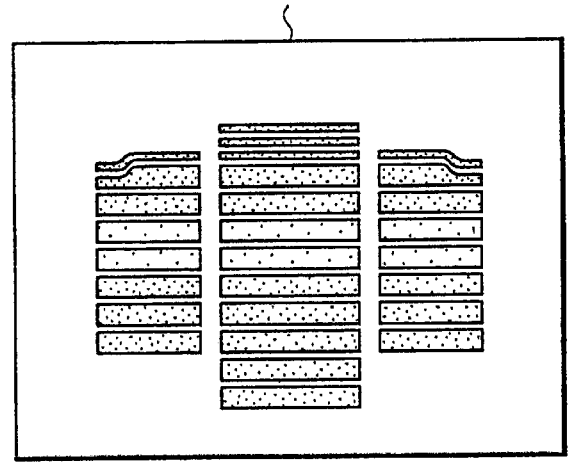
(c) 32 Pattern
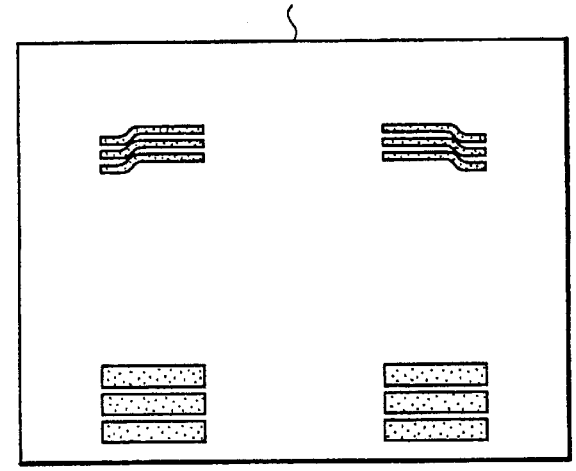

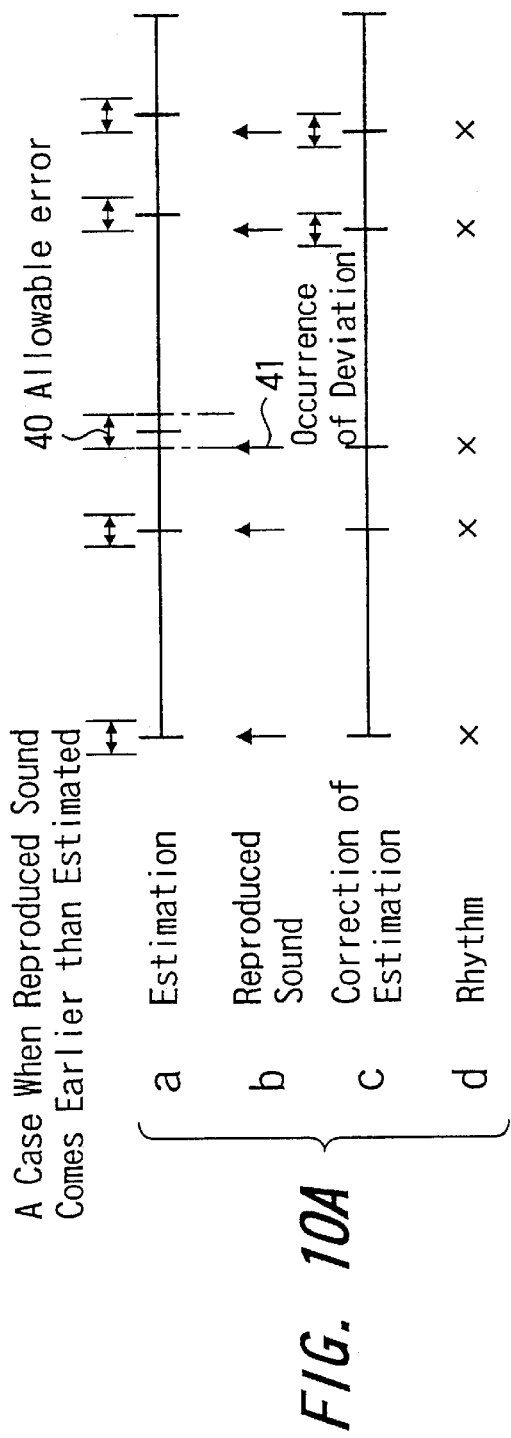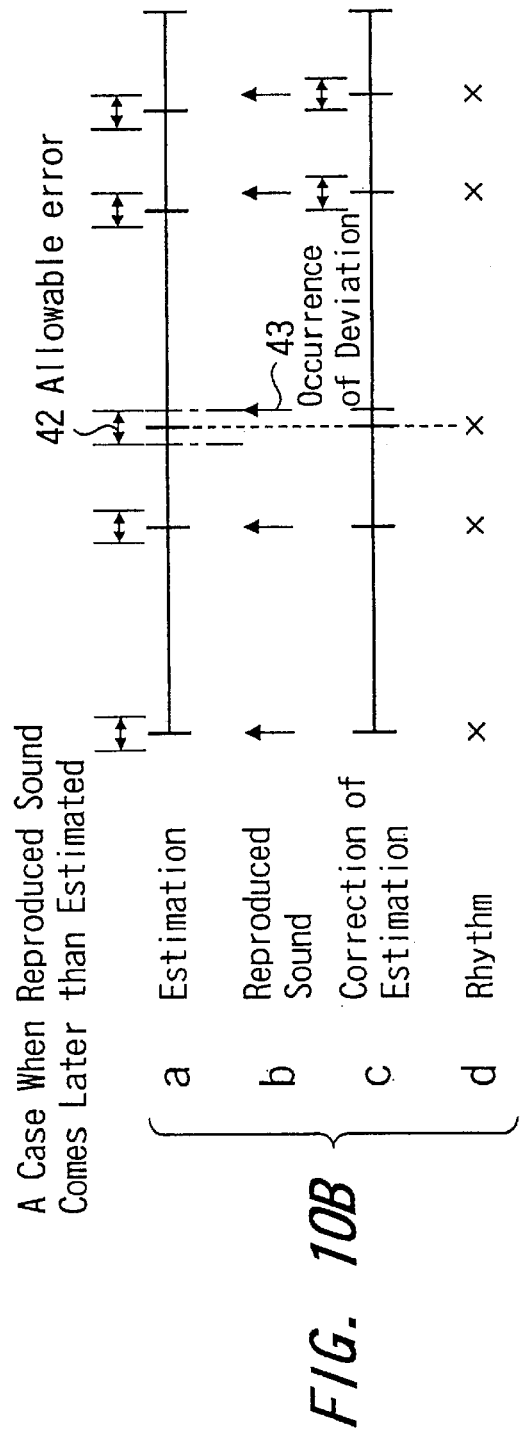
FIG. 10A
FIG. 10B

REPRODUCING APPARATUS

BACKGROUND OF THE INVENTION

1. Field of the Invention

The present invention relates to a reproducing apparatus in which, for example, a predetermined sound source is superimposed according to a reproduced audio signal level, a tempo of a reproduced music is detected according to an envelope of the reproduced audio signal to change animation representation in synchronism with the detected tempo, a rhythm box is reproduced in synchronism with the detected tempo and a sound field is automatically selected and synthesized corresponding to the detected tempo.

2. Description of the Related Art

Conventionally, an audio system including a compact disc (hereinafter referred to as CD: registered mark) player, a mini disc (hereinafter referred to as MD: registered mark) player, a recorder, a tuner, an amplifier, a speaker and the like has been known.

In such an audio system, when an audio signal recorded in the CD or MD is reproduced, usually, a user himself/herself plays a rhythm box or a drum pad and mixes that produced rhythm with a reproduced audio signal to perform the reproduction.

In the conventional audio system, the audio signal recorded in the CD or MD is divided into a plurality of bands and levels thereof are indicated in a belt-like form on a liquid crystal display.

The above mentioned belt-like level indication is generally carried out in a so-called spectrum analyzer style, in which the audio electric signal is divided into respective frequency bands and an amplitude of each frequency band is indicated by level so as to make it possible to see a basic wave of the waveform, distribution and amplitude of harmonic components on a display screen.

However, first, the conventional audio system has a problem that since the user himself mixes a sound from a rhythm box or a drum pad with a reproduced audio signal by his operation, the rhythm may deviate and further the sound from the rhythm box or drum pad cannot be mixed with every genre of music.

Secondly, a conventional reproduction apparatus has a problem that because the spectrum analyzer indication thereof can only indicate an instantaneous sound level, an interactive indication corresponding to a music genre is impossible.

Thirdly, because the user himself mixes a sound from a rhythm box or a drum pad with a reproduced audio signal by his operation, if the tempo of audio sound to be reproduced signal is changed, it is difficult to follow that change. Further, because it is difficult for the user to recognize the tempo of reproduced music, it is very hard for him to mix a sound from the rhythm box or drum pad corresponding to the music tempo.

Fourthly, because the user has to determine the genre of audio sound to be reproduced himself and set its original sound field by a complicated manual operation, an optimum sound field cannot be always set corresponding to every genre of music.

SUMMARY OF THE INVENTION

Accordingly, to solve the first problem described above, an object of the present invention is to provide a reproducing apparatus capable of mixing a sound from a rhythm box or a drum pad to meet every genre of music.

To achieve the above object, from a first aspect of the invention, there is provided a reproducing apparatus comprising: a band dividing means for dividing an input audio signal to a plurality of bands; an envelope detecting means for detecting an envelope value at each band divided by the band dividing means; a first memory means for holding an envelope value detected by the envelope detecting means for each band; a second memory means for holding the envelope value stored in the first memory means by shift in time series; an operation means for calculating a difference value between a previous envelope value held in the second memory means and a present envelope value held by the first memory means at every band; a sound source generating means for generating a plurality of effect sounds; and a sound source generation control means for switching a sound source generated by the sound source generating means based on the difference value calculated by the operation means.

Further, to solve the second problem described above, an object of the present invention is to provide a reproducing apparatus capable of displaying interactively corresponding to every genre of music. To achieve the above object, from a second aspect of the invention, there is provided a reproducing apparatus comprising: a band dividing means for dividing an input audio signal to a plurality of bands; an envelope detecting means for detecting an envelope value at every band divided by the band dividing means; a first memory means for holding an envelope value detected by the envelope detecting means at every band; a second memory means for holding the envelope value stored in the first memory means by shift in time series; an operation means for calculating a difference value between a present envelope value stored in the first memory means and a previous envelope value stored in the second memory means at every band; an image memory means for storing a plurality of display patterns; a display means for displaying a display pattern read out from the image memory means; and an image memory means control means for switching a display pattern generated from the image memory means based on a difference value calculated by the operation means.

Still further, to solve the third problem described above, an object of the present invention is to provide a reproducing apparatus in which a mixing of a sound from a rhythm box or a drum box corresponding to music of every genre is possible. To achieve the above object from a third aspect of the invention, there is provided a reproducing apparatus comprising: a band dividing means for dividing an input audio signal to a plurality of bands; an envelope detecting means for detecting an envelope value at every band divided by the band dividing means; a first memory means for holding an envelope value detected by the envelope detecting means at every band; a second memory means for holding an envelope value stored in the first memory means by shift in time series; an operation means for calculating a difference value between a present envelope value stored in the first memory means and a previous envelope value stored in the second memory means at every band; a tempo measuring means for measuring a tempo based on the difference value calculated by the operation means; a rhythm sound source generating means for generating a plurality of kinds of rhythm patterns; a synthesizing means for synthesizing the input audio signal with a rhythm pattern generated by the rhythm sound source generating means; and a rhythm sound source generation control means for synchronizing a rhythm sound source generated from the rhythm sound source generating means with the input audio signal based on the tempo information measured from the tempo measuring means.

Still further, to solve the fourth problem described above, an object of the invention is to provide a reproducing apparatus in which a sound field is automatically set corresponding to every genre of music.

BRIEF DESCRIPTION OF THE DRAWINGS

FIG. 4 is a table showing an example of tone generated by a sound source generating apparatus 16 of the reproducing apparatus according to the embodiment of the present invention shown in FIG. 2;

FIG. 6 shows a display pattern to be displayed on a display portion 14 of the reproducing apparatus according to the second embodiment of the present invention;

FIG. 10A shows a timing chart of rhythm synchronization in a case when a reproduced sound is made earlier than expected in the third embodiment of the present invention;

FIG. 10B shows a timing chart of rhythm synchronization in a case when the reproduced sound is made later than expected in the third embodiment of the present invention.

DESCRIPTION OF THE PREFERRED EMBODIMENTS

Hereinafter, the embodiments of the present invention will be described in the following items.
1. Description of Block Diagrams According to the First to Fourth Embodiments of the Present Invention
2. Description of Operations of the First to Fourth Embodiments of the Present Invention
3. Description of a Process Procedure According to the First Embodiment of the Present Invention
4. Description of a Process Procedure According to the Second Embodiment of the Present Invention
5. Description of the Process Procedure According to the Third Embodiment of the Present Invention
6. Description of the Process Procedure According to the Fourth Embodiment of the Present Invention
7. Rhythm Synchronizing Procedure According to the Third and Fourth Embodiments of the Present Invention
8. Description of an Operation for Rhythm Synchronization According to the Present Invention
9. Description of an Operation for Detecting a Cyclic Pattern According to the Present Invention
10. Description of Block Diagrams According to the First to Fourth Embodiments of the Present Invention First, a configuration of a reproducing apparatus according to this embodiment will be described with reference to an appearance perspective view shown in FIG. 1.

Figure 1:
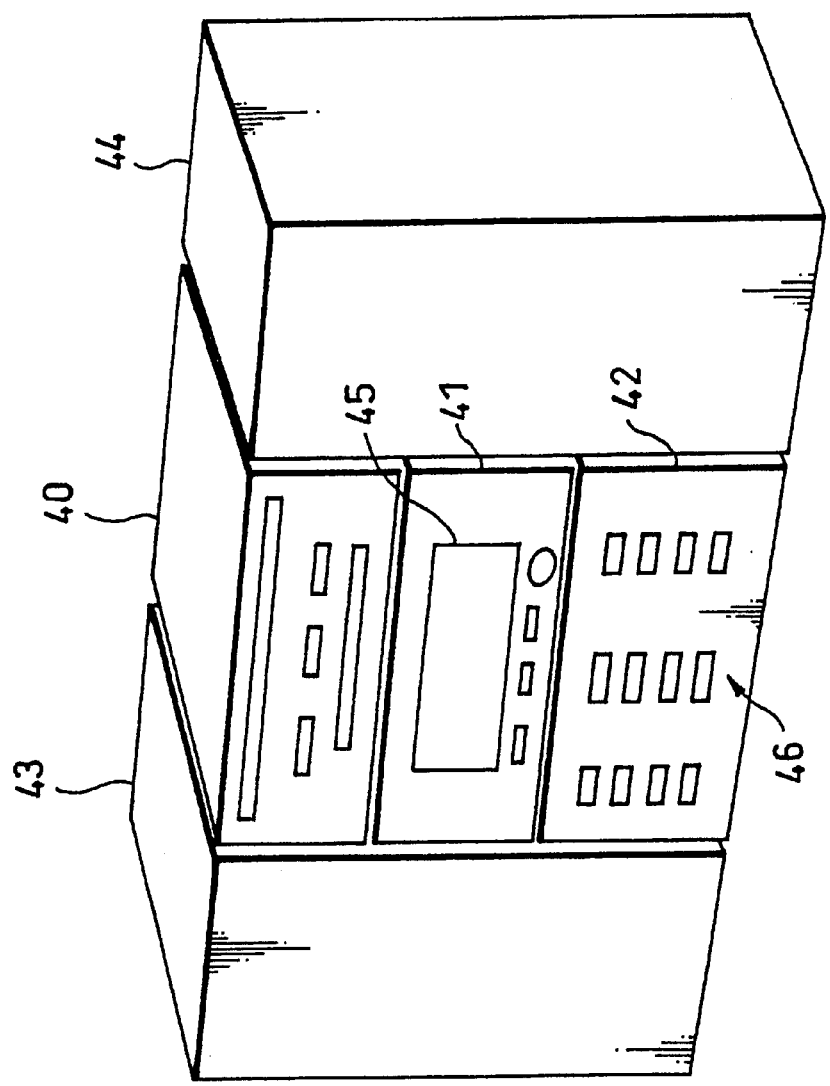
FIG. 1 is an appearance perspective view of a reproducing apparatus which is applied to the present invention.

In FIG. 1, the reproducing apparatus comprises a CD/MD deck operating unit 40 capable of operating a CD and MD for reproducing, a tuner operating unit 41 capable of receiving an FM radio broadcasting, an amplifier operating unit 42 capable of amplifying an audio signal, and speakers 43, 44 for converting an audio signal amplified by an amplifier to a sound, and reproducing an audio signal recorded in the CD or MD. The CD/MD operating unit 40, the tuner operating unit 41, and amplifier operating unit 42 are incorporated in the same case.

Specifically, according to the first embodiment of the present invention, a particular tempo is detected from a difference value of an envelope value of a reproduced audio signal and a sound source generated by a sound source generating means is automatically switched corresponding to the particular tempo, so as to automatically superimpose a sound in correspondence to or match with a reproduced music.

Specifically, according to the second embodiment of the present invention, a display unit 45 executes not only a similar display to a spectrum analyzer in which an audio signal recorded in the CD or MD is divided into a plurality of bands and a belt-like display is carried out corresponding to the level of the audio signal, but also corresponding to a music reproduced by the CD/MD operating unit 40 or the tuner operating unit 41 via a speaker, displays a violent motion animation if a strong beat music is produced, for example, and on the contrary, displays a slow motion animation if a mild music like a ballad is produced, thereby automatically switching the animation display according to genre.

Further, according to the third embodiment of the present invention, a particular tempo is detected from a difference value of an envelope value of a reproduced audio signal and a rhythm is generated by a rhythm generator corresponding to the particular tempo, so as to automatically superimpose a rhythm in correspondence to a reproduced music.

Further, according to the fourth embodiment of the present invention, a particular tempo and a cyclic property are detected from a difference value of an envelope value of a reproduced audio signal and a music is recognized according to this tempo and cyclic property so as to control the reproduced sound so that an optimum sound field is automatically secured corresponding to the reproduced music.

Figure 2:
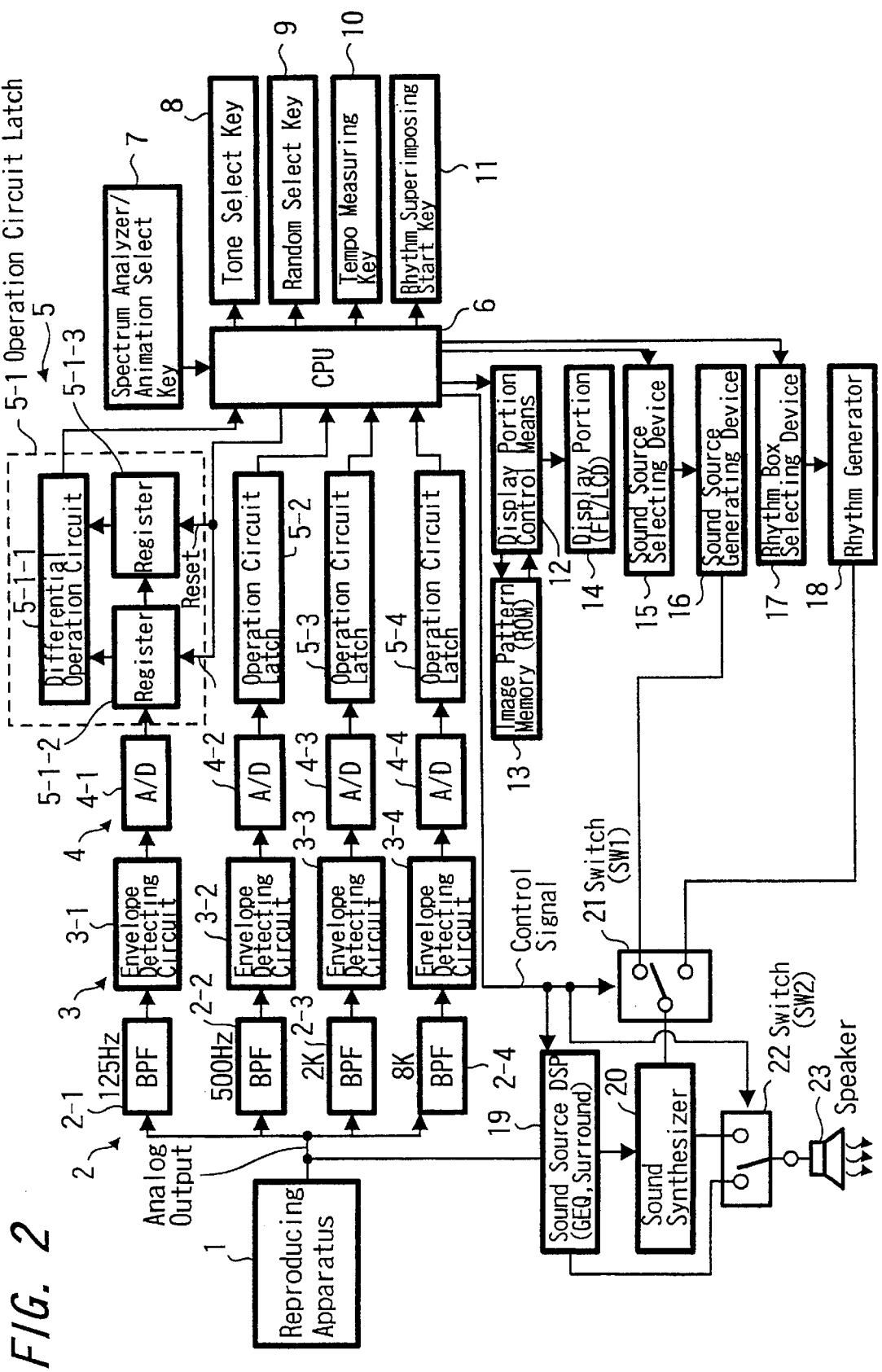
FIG. 2 is a block diagram showing a configuration of a reproducing apparatus to which applied is the present invention.

Next, a block diagram showing a configuration of a reproducing apparatus of the first to fourth embodiments of the present invention will be described with reference to FIG. 2. In FIG. 2, the reproducing apparatus of the embodiment has a reproducing means 1 for reproducing an audio signal recorded in the CD or MD so as to output an analog audio signal. The reproducing means 1 corresponds to the reproducing apparatus shown in FIG. 1. The reproducing apparatus of the embodiment comprises band pass filters BPF 2-1(125 Hz), BPF 2-2(500 Hz), BPF 2-3 (2 kHz), BPF 2-4 (8 kHz) for dividing the analog audio signal into four bands, envelope detecting circuits 3-1, 3-2, 3-3, 3-4 each for detecting an envelope of each band, A/D conversion circuits 4-1, 4-2, 4-3, 4-4 each for converting the analog audio signal which has been subjected to the envelope detection into a digital value, and operation circuits 5-1, 5-2, 5-3, 5-4 each for calculating a difference value between a previous sampling value and a present sampling value from a digital value.

The operation circuit 5-1 comprises a register 5-1-3 for storing a previous sampling value, a register 5-1-2 for storing a present sampling value and a differential operation circuit 5-1-1 for calculating a difference value between a previous sampling value stored in the register 5-1-3 and a present sampling value stored in the register 5-1-2. A latch signal is supplied from a CPU 6 to the register 5-1-2 and a reset signal is supplied to the register 5-1-3 from the CPU 6 when each sampling is terminated. Although not shown, the operation circuits 5-2, 5-3, 5-4 have the same configuration as the operation circuit 5-1, that is, each comprising a register for storing a previous sampling value, a register for storing a present sampling value and a difference operation circuit for calculating a difference between the previous sampling value stored in the register and the present sampling value stored in the register.

The reproducing apparatus of the embodiment has the CPU 6 for controlling sampling operations and calculating operations from the band pass filters BPF 2-1 (125 Hz), BPF 2-2 (500 Hz), BPF 2-3 (2 kHz), BPF 2-4 (8 kHz), through the envelope detecting circuits 3-1, 3-2, 3-3, 3-4, and the A/D conversion circuits 4-1, 4-2, 4-3, 4-4 to the operation circuits 5-1, 5-2, 5-3, 5-4 and subsequent stage circuits, and particularly for performing control so as to measure a tempo of music from a difference value and superimpose a sound source generated from a sound source generator 16 which will be described later onto a reproduced audio signal by a sound synthesizer 20.

Further, the reproducing apparatus of the embodiment comprises a spectrum analysis/animation select key 7 for selecting which spectrum analyzer display or animation display corresponding to music will be executed on a display unit which will be described later on, a tone select key 8 for selecting a tone to be superimposed on a reproduced sound which will be described later, a random select key 9 for selecting at random superimposing of sound on a sound source or a reproduced sound from a rhythm box which will be described later, a tempo measuring key 10 for starting measuring of the tempo of the reproduced sound by measuring difference values by the operation circuits 5-1, 5-2, 5-3, 5-4, and a rhythm superimposing start key 11 for starting superimposing of the sound on the sound source or reproduced sound of the rhythm box which will be described later.

The tone to be superimposed by the tone select key 8 includes a percussion instrument sound 30, an effect sound 31, a voice sound 32 and the like as shown in FIG. 4. The percussion instrument sound includes, as drum sound, tight kick, loose snare, open/close hihat, low/high tom, side stick, and as Latin percussion instrument sound, hand clap, open/close conga, cabasa, claves, low/high cowbell, tambourin, techno kick, low/high whistle, and scratch.

Some percussion instrument sounds 30 contain two kinds of sounds, namely high and low which are of the same tone. Further, some percussion instrument sounds 30 contain two kinds of sounds, open sound and close sound which are of the same tone. Further, the effect sounds 31 include punch, beep, squeal, and clush. Further, the voice sounds include 32 ha, go, hey, aoh, shout, yeah, hooo, yah and sexy.

Further, the reproducing apparatus of the embodiment comprises a display unit control means 12 for controlling display or the display unit, an image pattern memory (read only memory ROM) 13 for storing various image patterns to be displayed on the display unit, and the display unit (fluorescent display tube FL: Fluorescent character display tube/liquid crystal device LCD: Liquid crystal display) 14 for displaying an animation corresponding to a music. A range in which the animation can be displayed on the display unit is, for example, 11 dots horizontally×7 dots vertically and one color of three colors can be displayed according to the position of each dot.

Further, the reproducing apparatus of the embodiment comprises a sound source selecting device 15 for selecting a sound to be superimposed on a reproduced sound, a sound source generating device 16 for generating a sound to be superimposed on a reproduced sound, a rhythm box selecting device 17 for selecting a rhythm to be superimposed on a reproduced sound, and a rhythm generator 18 for generating a rhythm to be superimposed on the reproduced sound.

Further, the reproducing apparatus of the embodiment comprises a sound source DSP (digital signal processor) 19 for controlling a sound field relative to an analog audio signal based on a control signal supplied from the CPU 6, a sound synthesizer 20 for synthesizing a sound or a rhythm to be superimposed on the reproduced sound, a switch 21 (SW1) for selectively switching a sound from the sound source generating device 16 or a rhythm from the rhythm generator 18 based on a control signal supplied from the CPU 6 to be supplied to the sound synthesizer 20, a switch 22 (SW2) for selectively switching a sound field control output from the sound source DSP 19 and the sound from the sound synthesizer 20 or a rhythm synthesizing output based on a control signal supplied from the CPU 6 and outputting it, and a speaker 23 for converting an electric signal to a sound and reproducing a music.

2. Description of Operations of the First-fourth Embodiments of the Present Invention An operation of the reproducing apparatus according to the first-fourth embodiments thus configured will be described with reference to a block diagram of FIG. 2.

In FIG. 2, the reproducing means 1 reproduces an audio signal recorded in a CD or MD and outputs an analog audio signal. The analog audio signal output from the reproducing means 1 is supplied to band pass filters BPF 2-1 (125 Hz), BPF 2-2 (500 Hz), BPF 2-3 (2 kHz), BPF 2-4 (8 kHz). The band pass filters BPF 2-1 (125 HZ), BPF 2-2 (500 Hz), BPF 2-3 (2 kHz), BPF 2-4 (8 kHz) each divide the analog audio signal into four bands. Here, each frequency of four bands of the band pass filters BPF 2-1 (125 Hz), 2-2 (500 Hz), 2-3 (2 kHz), 2-4 (8 kHz) is a center frequency of that band. A band pass action of the four bands is of resonant cavity type and the value of Q expressing a sharpness of the resonance is 1.

Analog audio signals respectively divided into the four bands are supplied to the envelope detecting circuits 3-1, 3-2, 3-3, 3-4, respectively. The envelope detecting circuits 3-1, 3-2, 3-3, 3-4 detect envelope values of the signals of the respective bands, respectively. The envelope values of the analog audio signals which have been envelope-detected are supplied to the A/D conversion circuits 4-1, 4-2, 4-3, 4-4, respectively. The A/D conversion circuits 4-1, 4-2, 4-3, 4-4 convert the envelope values to digital values, respectively. The digital values are supplied to the operation circuits 5-1, 5-2, 5-3, 5-4, respectively. The operation circuits 5-1, 5-2, 5-3, 5-4 calculate difference values between the previous sampling values and the present sampling values from these digital values, respectively.

Specifically, the operation circuit 5-1 operates as follows. The register 5-1-3 stores the previous sampling value. The register 5-1-2 stores the present sampling value. The difference operation circuit 5-1-1 calculates a difference value between the previous sampling value stored in the register 5-1-3 and the present sampling value stored in the register 5-1-2. Although not shown, the operation circuits 5-2, 5-3, 5-4 operate in the same manner as the operation circuit 5-1, namely, when n=2–4, the register 5-n-3 stores the previous sampling value and the register 5-n-2 stores the present sampling value and then the difference operation circuit 5-n-1 calculates a difference value between the previous sampling value stored in the register 5-n-3 and the present sampling value stored in the register 5-n-2.

In this way, the difference value of each envelope value of the audio signal can be obtained. By obtaining the difference value of each sampling value in this way, a differential value which is a degree of change of the envelope value can be obtained. That is, by detecting a predetermined pattern of the difference value, a constant pattern which is repeated in an audio signal can be obtained.

Further, by obtaining the difference value of each sampling value, a differential value which is a degree of change of the envelope value can be obtained. That is, by detecting a specified pattern of the difference value, a constant pattern which is repeated in an audio signal can be obtained. Further, by detecting a predetermined cyclic pattern of the difference value, a specific cyclic pattern which is repeated in the audio signal can be obtained.

Also the CPU 6 controls the sampling operations and the calculating operations from the band pass filters BPF 2-1 (125 Hz), 2-2 (500 Hz), 2-3 (2 kHz), 2-4 (8 kHz) though the envelope detecting circuits 3-1, 3-2, 3-3, 3-4 and the A/D conversion circuits 4-1, 4-2, 4-3, 4-4 to the operation circuits 5-1, 5-2, 5-3, 5-4 and controls subsequent stage circuits, and particularly in the first embodiment, it measures a music tempo from the difference value so as to control that a sound source generated from the sound source generating device 16 corresponding to the tempo is superimposed on the reproduced audio signal by the sound synthesizer 20. A specific control method will be described later with reference to a flow chart of FIG. 3.

Figure 5:
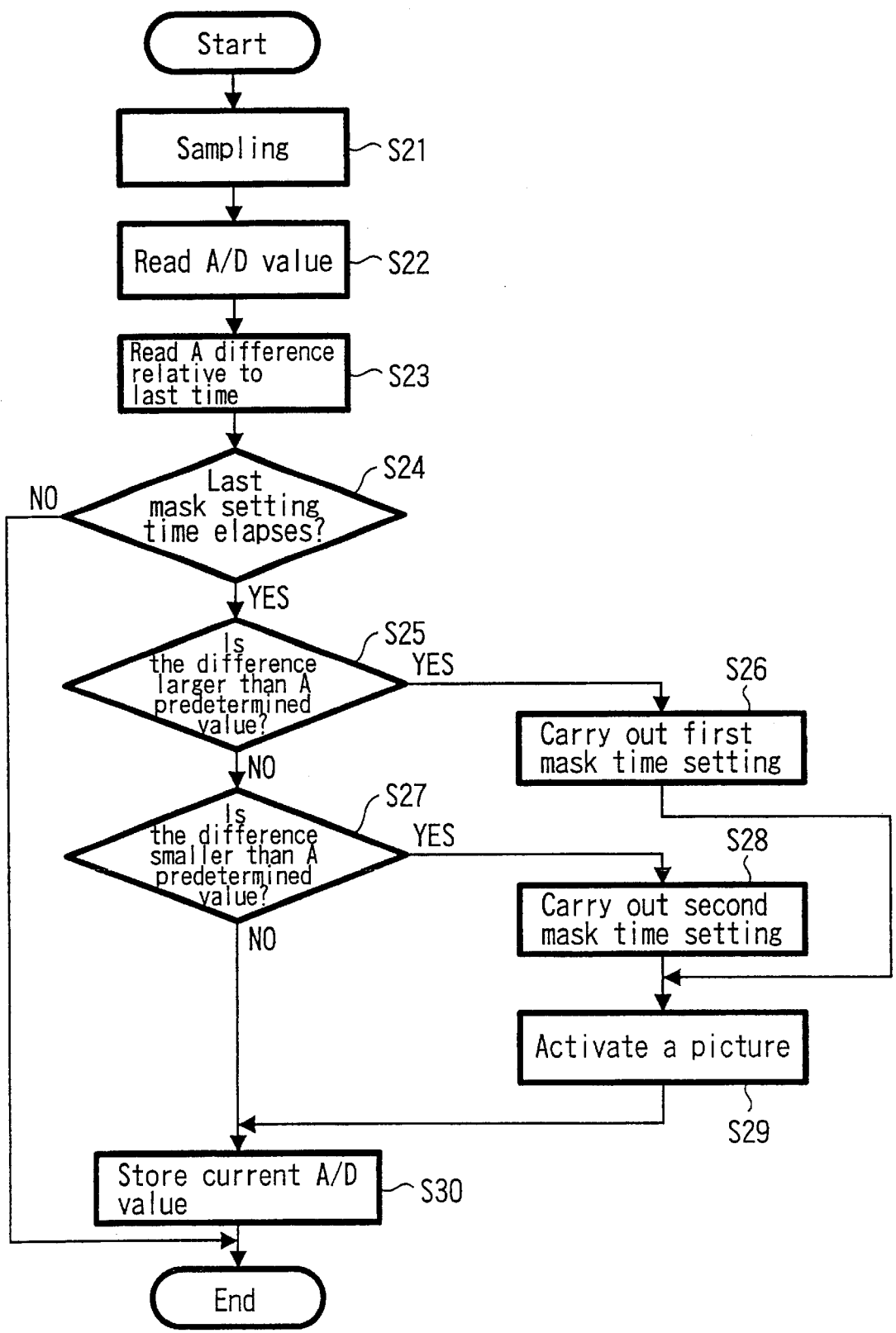
FIG. 5 is a flow chart showing an operation of the reproducing apparatus according to a second embodiment of the present invention.

Further, particularly in the second embodiment, the CPU 6 measures a music tempo from the difference value measured as above so as to control the animation display on the display unit 14 corresponding to the measured tempo. A specific control method will be described later with reference to a flow chart of FIG. 5.

Further, particularly in the third embodiment, the CPU 6 measures a music tempo from the difference value so as to control that a rhythm generated from the rhythm generator 18 corresponding to the tempo is superimposed on the reproduced audio signal by the sound synthesizer 20 in synchronism therewith. A specific control method will be described later with reference to a flow chart of FIG. 7.

Further, particularly in the fourth embodiment, the CPU 6 measures a tempo and a cyclic property of music from the difference value measured as above so as to recognize the kind of the music according to the measured tempo and cyclic property and controls the sound source DSP 19 to add a sound field corresponding to the music to the reproduced signal. A specific control method will be described later with reference to a flow chart of FIG. 8.

The tempo measuring key 10 enables the CPU 6 to measure a tempo of the reproduced sound by measuring of the difference value by the operation circuits 5-1, 5-2, 5-3, 5-4. Specifically, if a user presses the tempo measuring key 10, for example, an orange light emission diode provided on a surface of the key blinks and the CPU 6 starts measuring the tempo of music being reproduced. After a predetermined sampling time, for example, the aforementioned 20 msec elapse, if the measuring is completed, a green light emission diode lights up and a sound source generated in the display unit 14 from the sound source generating device 16 corresponding to the music can be superimposed on the reproduced audio signal by the sound synthesizer 20 in synchronism therewith. Therefore, at the same time when the tempo measuring key 10 is pressed, the tempo of music is measured and the user can confirm that a corresponding sound source is superimposed on the reproduced audio signal audibly.

Further, it is permissible to identify the kind of music by the aforementioned tempo measurement and change the sound source to be superimposed on the reproduced audio signal by recognizing the kind of music.

Also, the display portion control means 12 controls display operation of the display unit 14 based on a control signal from the CPU 6. The image pattern memory (ROM) 13 stores various image patterns to be displayed on the display unit 14.

FIG. 6 shows an example of display according to the second embodiment of the present invention. In FIG. 6, an image pattern 30 indicates a small fireworks shot off, an image pattern 31 indicates a large fireworks shot off and an image pattern 32 indicates a falling condition of shot fireworks, respectively.

By storing these image patterns 30 to 32 in the image pattern memory (ROM) 13 in advance and supplying the same corresponding to the tempo of music to update the display unit 14 to thereby update the display, an animation corresponding to the music can be displayed.

Each of the patterns 30 to 32 is constituted of data corresponding to 11 dots horizontally×7 dots vertically which is a range of the display unit, capable of displaying an animation. Depending on the position of each dot, one color of three colors, red, orange, and blue is displayed.

Meanwhile, this pattern is only an example, and it is needless to say that the other animation display may be used.

The spectrum analyzer/animation select key 7 enables to select which spectrum analyzer display or animation display corresponding to music is to be made on the display unit 14. Usually, the initial setting condition is an animation selecting condition. If a user presses the spectrum analysis/animation select key 7, the display is switched to the spectrum analyzer display. If the spectrum analysis/animation select key 7 is pressed again, the display is switched to the animation selection condition.

As described above, the tone select key 8 enables selection of the tone of the reproduced sound. If the user presses the tone select key 8, the sound source selecting device 15 selects a sound to be superimposed on the reproduced sound based on a control signal from the CPU 6. The sound source generating device 16 generates a sound selected so as to be superimposed on the reproduced sound.

The rhythm superimposing start key 11 starts superimposing a sound on a sound source or a sound reproduced by a rhythm box. If the user presses the rhythm superimposing start key 11, the rhythm box selecting device 17 selects a rhythm to be superimposed on the reproduced sound based on a control signal from the CPU 6. The rhythm generator 18 generates a rhythm to be superimposed on the reproduced sound.

As described above, the random select key 9 enables selecting a sound to be superimposed on a sound source or a sound reproduced by the rhythm box at random. If the user presses the random select key 9, the sound source selecting device 15 or the rhythm box selecting device 17 selects a sound source or a rhythm to be superimposed on the reproduced sound based on a control signal from the CPU 6.

The sound source DSP 19 controls a sound field for the analog audio signal based on a control signal supplied from the CPU 6. The analog audio signal which has been subjected to sound field control is supplied to the sound synthesizer 20.

The switch 21 (SW1) selectively switches a sound from the sound source generating device 16 or a rhythm from the rhythm generator 18 based on a control signal supplied from the CPU 6 and supplies the same to the sound synthesizer 20. The sound synthesizer 20 synthesizes a sound or a rhythm to be superimposed on the reproduced sound.

The switch 22 (SW2) selectively switches a sound field control output from the sound source DSP 19 and a sound or rhythm synthesizing output from the sound synthesizer 20 based on the control signal supplied from the CPU 6 and outputs the same. The speaker 23 converts an electric signal to a sound so as to reproduce music.

3. Description of a Process Procedure According to the First Embodiment of the Present Invention Here, an operation of the CPU 6 relating to the first embodiment will be described with reference to the flow chart of FIG. 3.

Figure 3:
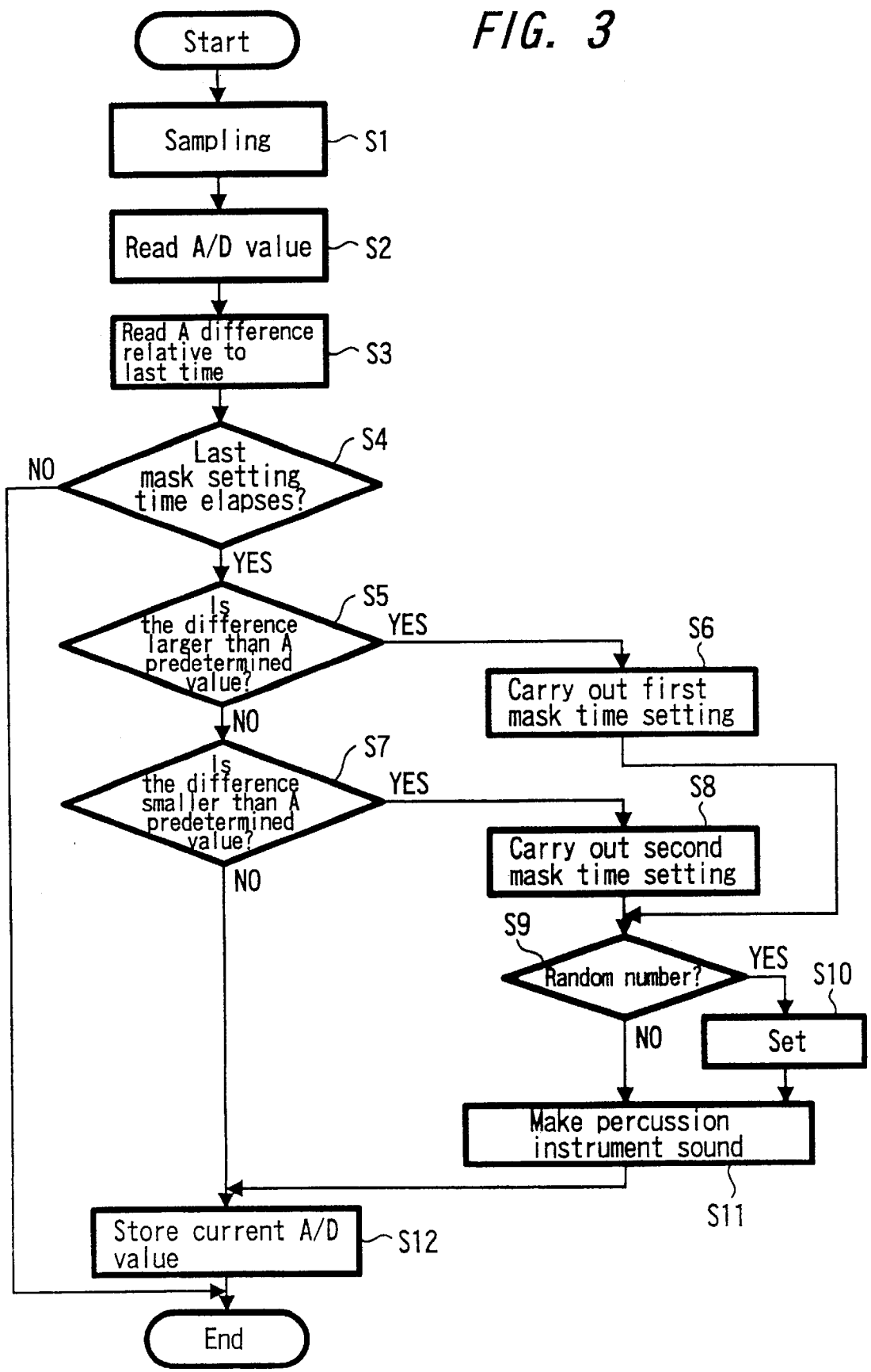
FIG. 3 is a flow chart showing an operation of the reproducing apparatus of a first embodiment of the present invention.

In FIG. 3, after the process starts, sampling is carried out at step S1. To be concrete, envelope values are sampled so as to carry out A/D conversion in the A/D conversion circuits 4-1, 4-2, 4-3, 4-4. The time period required for this sampling is 5 msec for 1 band, and 20 msec for four bands. At step S2, A/D values are read. Specifically, digital envelope values which have been subjected to A/D conversion at the A/D conversion circuits 4-1, 4-2, 4-3, 4-4 are read. At step S3, a difference relative to the previous time is read. Practically, difference values calculated by the operation circuits 5-1, 5-2, 5-3, 5-4 are read.

A determination is made as to whether or not the previous mask setting time has passed at step S4. To be concrete, when a sound source generated from the sound source generating device 16 is superimposed on the reproduced signal by the sound synthesizer 20, of time intervals of the sound source to be superimposed, a minute time interval that the user cannot feel is set as an insensitive (mask) setting time. Then, if the mask setting time does not elapse, the process is terminated. If the mask setting time elapses, each process of steps S5–S10 is carried out.

When the mask setting time elapses at step S4, the process proceeds to step S5, at which a determination is made as to whether or not a difference value is a quite large value. Specifically, whether or not the difference value is more than 10 dB is determined. When the difference value is a quite large value at step S5, the process proceeds to step S6, at which a first mask time setting is carried out. Specifically, the mask setting time at step S4 is set to a relatively long time, for example, 500 msec.

Then, the process proceeds to step S9, at which whether or not generation of a sound source is set to be selected by a random number is determined. Specifically, when the user presses the random select key 9, it is determined that generation of a sound source is set to be selected by the random number and then a control signal for selecting a sound source by the random number is supplied from the CPU 6 to the sound source selecting device 15. Then, based on the control signal for selecting a sound source by this random number, the sound source generating device 16 generates a sound source based on the random number. This random number uses, for example, a running timer of the CPU 6. The CPU 6 generates a control signal corresponding to a value of remainder produced when timer time T of the running timer when the random select key 9 is pressed is divided by 59, so as to select an allocated sound source.

If generation of a sound source is set to be selected by the random number at step S9, the process proceeds to step S10, in which generation of the sound source is set based on the random number. To be concrete, the CPU 6 supplies a control signal for selecting the sound source to the sound source selecting device 15 and then, based on the control signal for selecting a sound source by this random number, the sound source generating device 16 generates a sound source based on the random number.

When at step S9, generation of a sound source is not set to be selected by the random number and when at step S10, generation of the sound source is set based on the random number, the process proceeds to step S11. Then, a percussion instrument sound is made at step S11.

Specifically, the sound synthesizer 20 superimposes a sound source generated, based on the random number, from the sound source generating device 16 on the reproduced audio signal. As a result, for example, the percussion instrument sound is superimposed on the reproduced music and output from the speaker 23.

If at step S5, the difference value is not quite a large value, the process proceeds to step S7, at which whether or not the difference value is a little large value is determined. Specifically, whether or not the difference value is, for example, more than 6 dB is determined. If at step S7, the difference value is a little large value, the process proceeds to step S8, at which the second mask time is set. To be concrete, the mask setting time at step S4 is set to relatively short, for example, 250 msec. Then, the process proceeds to step S9, at which the same determination and process as step S9 to S11 are carried out.

If at step S7, the difference value is not a little large value and after the percussion instrument sound is made at step S11, the process proceeds to step S12, at which the present A/D value is stored. Specifically, the stored digital envelope value is processed so as to be used for a difference at a next sampling time and then the process is terminated.

As described above, when a user listens to a music by reproducing an audio signal, a tempo of the music is measured according to an obtained difference value and a sound source generated by the sound source generating means is switched with, for example, a rising time of the envelope value or the like as a trigger in accordance with the tempo of the music, so as to automatically superimpose a sound on the reproduced music. Thus, it is possible to reproduce a music which the user is used to listen in a different fashion. Further, because the sound is superimposed corresponding to the reproduced music rhythm, rhythm can be stressed about every kind of music, so that every music can be reproduced like dance music.

4. Description of a Process Procedure According to the Second Embodiment of the Present Invention An operation of the CPU 6 according to the second embodiment will be described with reference to a flow chart shown in FIG. 5. Comparing FIG. 3 with FIG. 5, because steps S1, S2, S3, S4, S5, S7, S12 of FIG. 3 which are the first embodiment correspond to steps S21, S22, S23, S24, S25, S27, S30 of FIG. 5 which are the second embodiment, a detailed description thereof is omitted.

When the difference value is a quite large value at step S25, the process proceeds to step S26, at which a first mask time setting is carried out. Specifically, the mask setting time at step S24 is set to a relatively long time, for example, 500 msec.

Then, the process proceeds to step S29, in which an image of animation displayed on the display unit 14 is updated. Specifically, the image of animation displayed on the display portion 14 is updated successively at each sampling, for example, with 170 images.

If at step S25, the difference value is not a quite large value, the process proceeds to step S27, at which whether or not the difference value is a little large value is determined. To be concrete, whether or not the difference value is, for example, more than 6 dB is determined. If at step S27, the difference value is a little large value, the process proceeds to step S28, at which the second mask time is set. Specifically, the mask setting time at step S24 is set to relatively short, for example, 250 msec. Then, the process proceeds to step S29, at which an image of animation displayed on the display unit 14 is updated with another image.

If at step S27, the difference value is not a little large value and after an image of animation is updated at step S29, the process proceeds to step S30, at which the present A/D value is stored.

As described above, when the user listens to a music by reproducing an audio signal, by measuring a tempo of the music according to an obtained difference value, an animation image can be updated successively and displayed on the display unit 14 with, for example, a rising time of the envelope value or the like as a trigger in accordance with the tempo of the music. Thus, it is possible to visually appeal dynamism of music to the user.

5. Description of the Process Procedure According to the Third Embodiment of the Present Invention Here, an operation of the CPU 6 according to the third embodiment of the present invention will be described with reference to FIG. 7.

Figure 7:
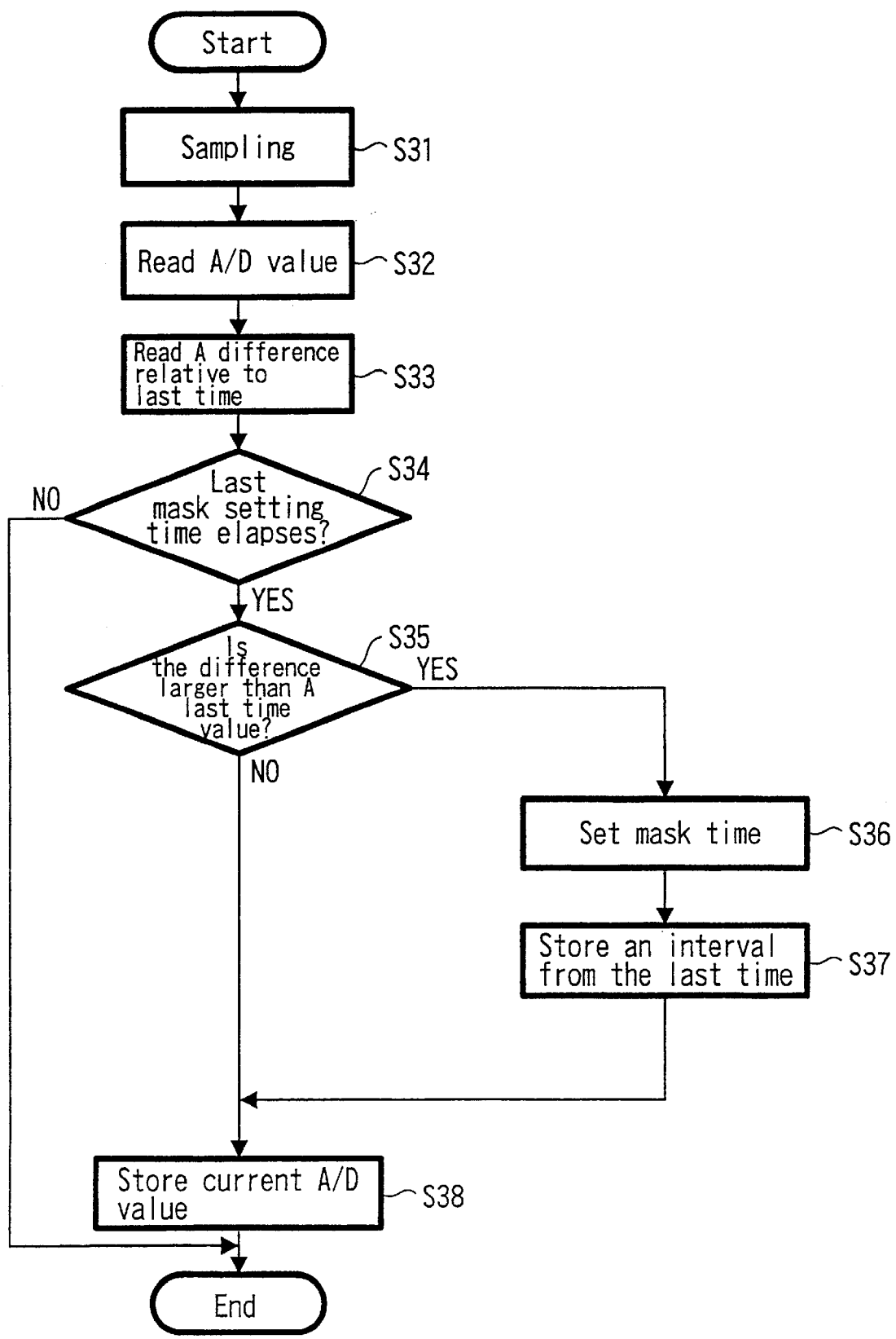
FIG. 7 is a flow chart showing an operation of the reproducing apparatus according to a third embodiment of the present invention.

Comparing FIG. 3 with FIG. 7, because steps S1, S2, S3, S4, S5, S12 of FIG. 3 which are the first embodiment correspond to steps; S31, S32, S33, S34, S38 of FIG. 7 which are the third embodiment, a detailed description thereof is omitted.

When the difference value is larger than a value which was latched previous time at step S35, the process proceeds to step S36, at which first mask time setting is carried out. Specifically, the mask time of 100 msec, for example, is set.

Then, the process proceeds to step S37, at which an interval relative to the previous time is stored. Specifically, when the user presses the tempo measuring key 10, the CPU 6 measures an interval between the previous and the present time at every sampling time and stores the values in a memory in succession and accumulates. As a result, the CPU 6 measures the tempo of music from the interval of the sound. When the user presses the rhythm superimposing start key 11, the CPU 6 detects a tempo of music from the interval of sound. Depending on the above detected tempo, a control signal for making the rhythm generator 18 to produce a rhythm is generated.

If the interval relative to the previous time is stored at step S37, the rhythm generator 18 generates a rhythm according to the control signal produced corresponding to the measured tempo. Specifically, the sound synthesizer 20 superimposes a rhythm generated from the rhythm generator 18 in synchronism with the reproduced sound on a reproduced audio signal in synchronism therewith at each sampling time. Consequently, for example, a drum rhythm selected by the rhythm box selecting device 17 is superimposed on the reproduced music and the synthesized music is output from the speaker 23.

If the interval relative to the previous time is stored at step S37 or if the difference value is not larger than the previous time at step S35, the process proceeds to step S38, at which the current A/D value is stored. Specifically, the stored digital envelope value is processed so as to be used as a difference at a next sampling time.

As described above, when the user listens to a music by reproducing an audio signal, a tempo of the music is measured according to an obtained difference value and a rhythm is generated by the rhythm generator 18 with, for example, a rising time of the envelope value or the like as a trigger in accordance with the tempo of the music, so as to automatically superimpose the rhythm on a first beat of the reproduced music. Thus, by automatically superimposing the rhythm corresponding to the reproduced music, the rhythm can be stressed in every kind of music, so that every music can be reproduced like dance music.

6. Description of the Process Procedure According to the Fourth Embodiment of the Present Invention Here, an operation of the CPU 6 according to the fourth embodiment of the present invention will be described with reference to FIG. 8.

Figure 8:
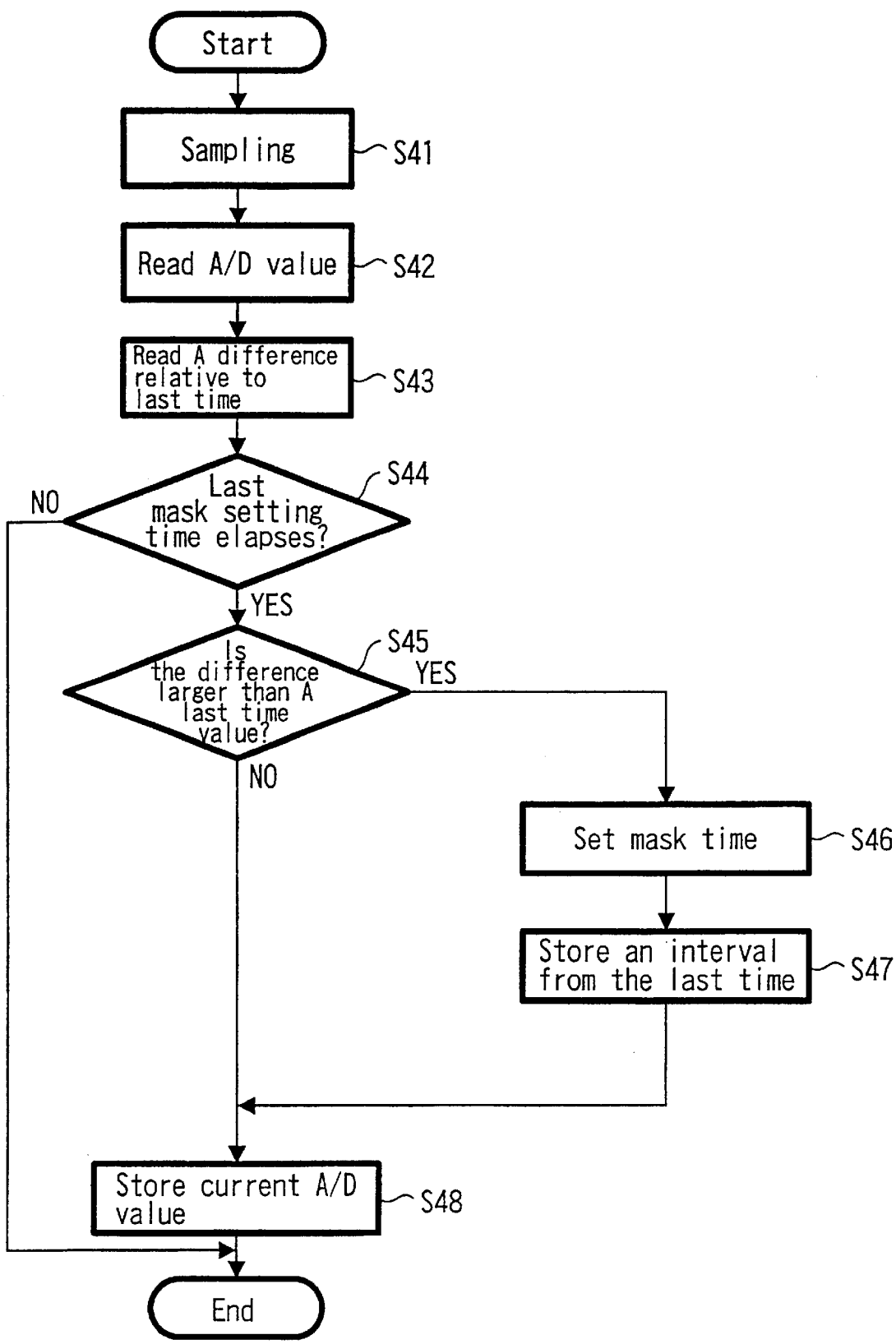
FIG. 8 is a flow chart showing an operation of the reproducing apparatus according to a fourth embodiment of the present invention.

Comparing FIG. 7 with FIG. 8, because steps S31, S32, S33, S34, S35, S38 of FIG. 7 which are the third embodiment correspond to steps S41, S42, S43, S44, S45, S48 of FIG. 8 which are the fourth embodiment, a detailed description thereof is omitted.

When the difference value is larger than a value which latched previous time at step S45, the process proceeds to step S46, in which a mask time setting is carried out. Specifically, the mask time of 100 msec is set.

Then, the process proceeds to step S47, at which an interval relative to the previous time is stored. To be concrete, when the user presses the tempo measuring key 10, the CPU 6 measures an interval between the previous time and the present time at each sampling time and stores the values in a memory in succession. As a result, the CPU 6 measures the tempo of music from the interval of the sound. When the user presses the sound field setting key (not shown), the CPU 6 detects the cyclic property of music from the interval of the music so as to determine the kind of the sound according to the tempo and cyclic property. Depending on the kind of music, a control signal for controlling adding of the sound field in the sound source DSP 19 is generated from the CPU 6.

After the interval relative to the previous time is stored at step S47, the sound field in the sound source DSP 19 is controlled according to the kind of music based on the measured tempo and cyclic property at every sampling. Specifically, at each sampling time, the CPU 6 detects the tempo and cyclic property of the music from the sound interval and determines the kind of the music based on the tempo and cyclic property measured. Then, the CPU 6 supplies a control signal for controlling the sound field in the sound source DSP 19 according to the kind of the music to the sound source DSP 19.

According to this embodiment, the sound source DSP 19 is constituted of a graphic equalizer (GEQ: Graphic Equalizer). The graphic equalizer divides the audible frequency band of the reproduced audio signal into several bands and changes the preset value based on the control signal so as to adjust the level independently at each band, thereby adding the sound field according to the kind of music. Further, according to this embodiment, the sound source DSP 19 may add a sound field effect by changing a preset value based on the control signal so as to adjust the level by sound or may add a sound field effect of a concert hall or theater famous in sound effect by switching the preset value of the filter based on the control signal.

When the interval relative to the previous time is stored at step S47 and the difference value is not larger than the previous time at step S45, the process proceeds to step S48, at which the current A/D value is stored. Specifically, the stored digital envelope value is processed so as to be used as the difference at the next sampling time and then, the process is terminated.

As described above, when the user listens to a music by reproducing an audio signal, a tempo and a cyclic property of the music are measured according to an obtained difference value and the kind of the music is recognized according to the tempo and cyclic property. In the music DSP 19, for example, with a rising time of the envelope value or the like as a trigger in accordance with the music, a sound field of reproduced sound is controlled. Thus, a sound field can be automatically added in time to the first beat of the reproduced music. Thus, by adding a sound field corresponding to the reproduced music, any music can be reproduced with the optimum sound field.

7. Rhythm Synchronizing Procedure According to the Third and Fourth Embodiments of the Present Invention Next, an operation of rhythm synchronism of the CPU 6 which is a base on detection of the tempo and cyclic property will be described with reference to a flow chart of FIG. 9.

Figure 9:
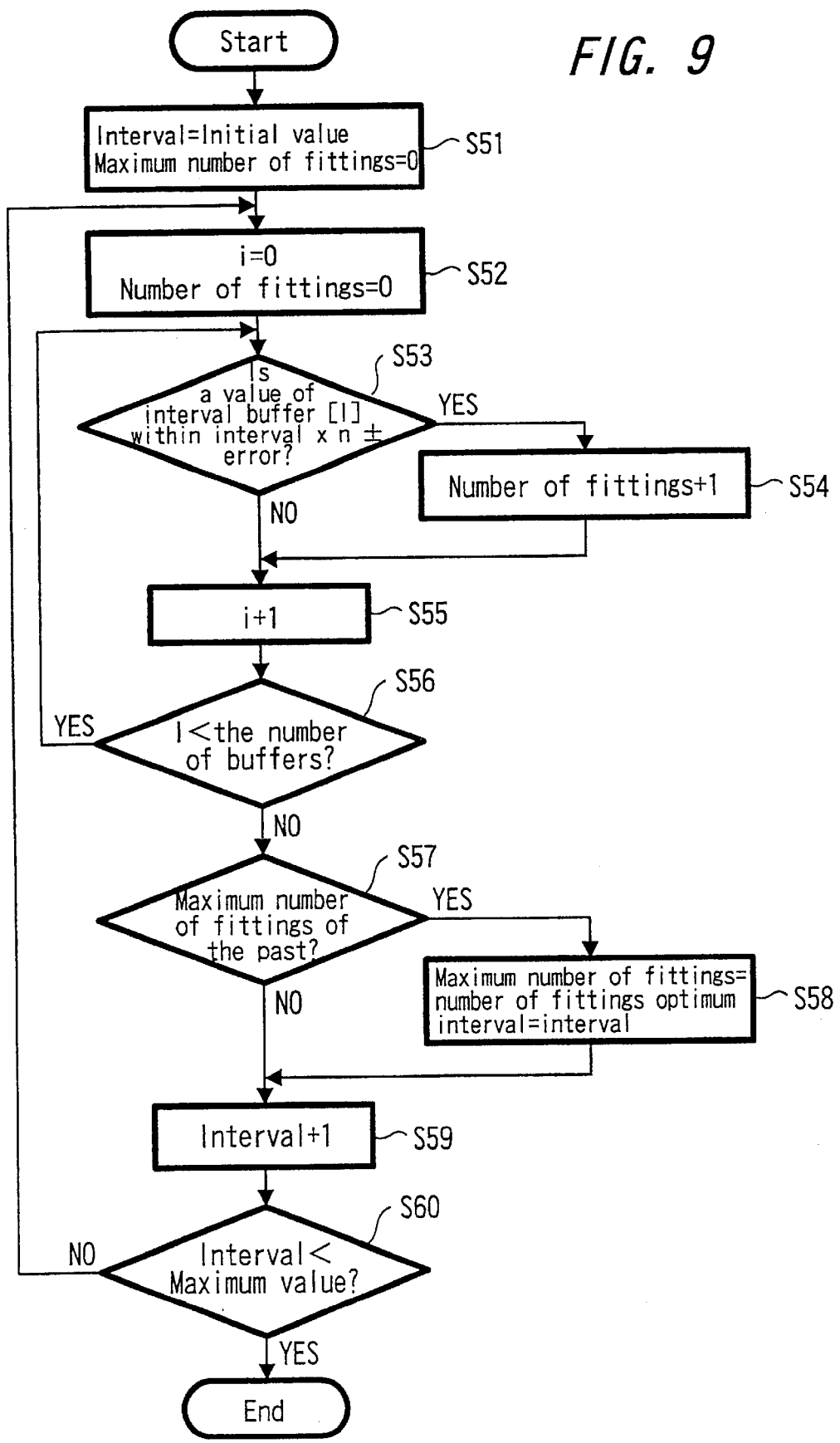
FIG. 9 is a flow chart showing an operation of the reproducing apparatus according to the third and fourth embodiments of the present invention.

In FIG. 9, after startup, interval=initial value and the maximum number of fittings=0 are set at step S51. Specifically, the sound interval is set to 100 to 200 msec which is the initial value and the maximum number of fittings for indicating a maximum value of times in which the sound interval is in an allowable range is set to 0. As for the sound, a value BPM (Beat Per Minute) which is a value of an integer times (×n) of a sixteenth notes with a reference is obtained and then a value of the integer times thereof is searched. In case of the sixteenth note, 99% fitting arises under BPM=100 to 160 and the sound interval at this time is 100 to 200 msec.

At step S52, the number of interval buffers i for storing the interval is set to 0 and the number of fittings is set to 0. Specifically, the value of the interval buffer capable of storing up to 32 sound intervals is cleared to reset the number of fittings.

At step S53, a determination is made as to whether or not the value of the interval buffer [i] is interval×n±error Specifically, whether or not the sound interval is within an allowable range of integer times sixteenth note is determined. If the value of interval buffer [i] is within interval× n±error at step S53, the process proceeds to step S54, at which 1 is added to the number of fittings. To be concrete, the number of fittings is incremented. Then, the process proceeds to step S55, in which i+1 is set. Specifically, the number [i] of the 32 interval buffers is incremented.

At next step S56, a determination is made as to whether or not i<the number of buffers is right. If i<the number of buffers is right at step S56, the process proceeds to step S57, and if i<the number of buffers is not right at step S56, the process returns to step S53. Specifically, until the number i of the interval buffers reaches 32, the determinations and processes of steps S53 to S56 are repeated. If i<the number of buffers is right at step S56, the process proceeds to step S57, at which a determination is made as to whether or not the number of fittings has reached the maximum of the past.

If the number of fittings has reached the maximum of the past at step S57, the maximum number of fittings=the number of fittings, optimum interval=interval are set at step S58. Specifically, a value of the maximum number of fittings indicating the maximum of times in which the sound interval is within an allowable range is substituted by a value of the number of fittings. At this time, 99% fitting arises under BPM=100 to 160 which is a value integer times (×n) of the sixteenth note. The sound interval at this time is 100 to 200 msec.

At step S59, 1 is added to the interval. Specifically, the interval is incremented by 1 and the process proceeds to the next interval. At step S60, whether or not interval<maximum value is right is determined. If interval<maximum value is right at step S60, the process is terminated, and if interval<maximum value is not right at step S60, the process returns to step S52. Specifically, until the number of measuring intervals reaches a measurement termination number, the determinations and processes of steps S52 to S60 are repeated and if the measurement termination number is reached, the process is terminated.

As described above, by measuring the interval of the reproduced sound, the tempo and the cyclic property are measured so as to recognize the kind of the music corresponding to the tempo and cyclic property. As a result, the sound field can be added to the reproduced sound corresponding to the music. Further, it is possible to generate a rhythm corresponding to the above measured tempo and superimpose it on the reproduced sound.

8. Description of an Operation for Rhythm Synchronization According to the Present Invention An operation of the rhythm synchronization to be executed according to the aforementioned flow chart of FIG. 9 will be described with reference to FIGS. 10A, 10B.

First, referring to FIG. 10A, rhythm synchronization of a case when a reproduced sound comes earlier than estimated will be described. The CPU 6 carries out an estimation a of a reproduced sound b. The estimation a includes an allowable error 40. If an early deviation 41 in time occurs in the reproduced sound b with respect to this estimation a, at the time of the estimation a of an occurrence of the deviation 41, the CPU 6 recognizes that deviation and corrects it. At the time of the estimation a of the occurrence of the deviation 41, an appropriate rhythm d corrected so as to be earlier corresponding to the deviation, is generated.

Next, in FIG. 10B, rhythm synchronization of a case when the reproduced sound comes later than an estimation will be described. The CPU 6 carries out the estimation a of the reproduced sound b. The estimation a includes an allowable error 42. When a later deviation 43 in time occurs in the reproduced sound b with respect to the estimation a, at the time of the estimation a of an occurrence of the deviation 43, the rhythm d deviates from the reproduced sound b because it occurs earlier corresponding to the estimation a. However, the CPU 6 recognizes the deviation in this period and corrects it, so that at the time of the next estimation a of the occurrence of the deviation 43, an appropriate rhythm d, corrected so as to be later in time corresponding to the deviation, is generated.

As a result, even if the interval of the reproduced sound deviates, the deviation is corrected by the rhythm synchronization and by generating a rhythm corresponding to this corrected tempo, the rhythm can be superimposed on the reproduced sound in synchronism therewith.

9. Description of an Operation for Detecting a Cyclic Pattern According to the Present Invention Next, an operation for detecting the cyclic pattern to be executed according to the flow chart of FIG. 9 will be described with reference to FIG. 11.

Figure 11:
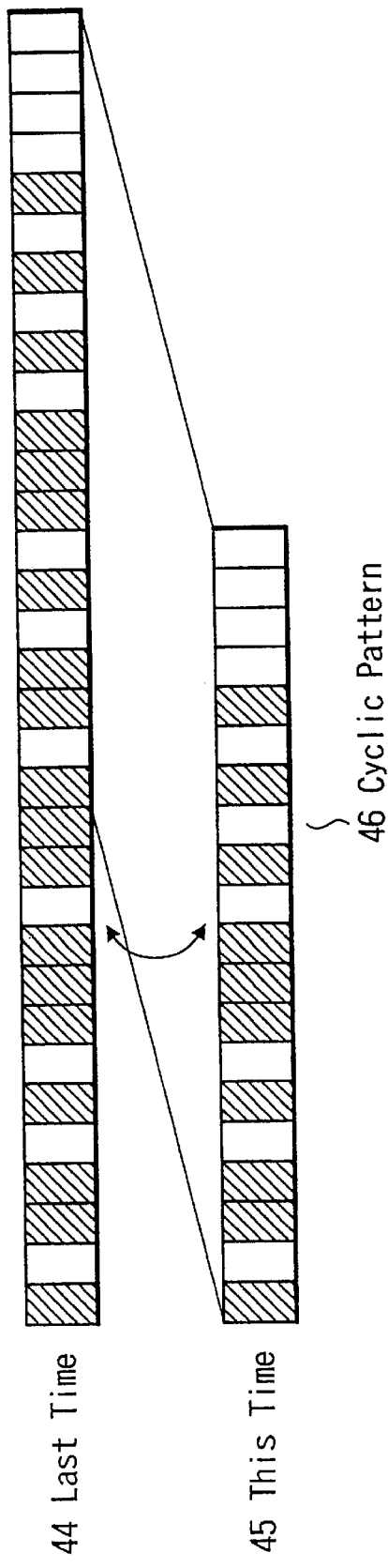
FIG. 11 is a diagram showing a cyclic detection of a pattern of the reproducing apparatus according to the fourth embodiment of the present invention.

In FIG. 11, at the sampling of the previous time 44, the interval of the reproduced sound is detected as indicated by the hatched portions. A vacant space indicates that there is no sound.

In FIG. 11, although the interval of the reproduced sound is detected as indicated by the hatched portions at the sampling of the current time 45, if the interval of the reproduced sound at the sampling of the current time 45 is compared with the interval of the reproduced sound at the sampling of the previous time 44 by shifting the interval thereof, it is made evident that there is a portion acting as a criterion for repeating the interval of the reproduced sound like the sampling of the previous time 44. This portion is a portion which becomes the cyclic pattern 46. Depending on the number of sounds of this cyclic pattern 46, presence/absence of continuation of the sound, interval or length of the cyclic pattern 46 or the like, it is possible to determine the kind of music such as jazz, rock, Latin, fusion, classic, dance music, ballad, 16-beat and the like or melody thereof.

In this manner, not only the cyclic property of sound but also the kind of the music are determined in time to the tempo. For a music having a strong beat or a music which goes round having a quick reference cyclic pattern, the sound field can be controlled so as to be violent. On the contrary, in a music having a mild stream or a music which goes round at a slow reference cyclic pattern, the sound field can be controlled so as to be soft.

As described above, according to the first embodiment, the characteristic (genre) of music can be recognized according to the difference value of the envelope value of the reproduced signal and by superimposing an effect sound on the recognized music in accordance therewith, a change of music can be expressed by rhythm of the superimposed effect sound, so that dynamism of music can be appealed to the user strongly.

Consequently, demonstration effect at a retailer store can be improved. Further, because the present invention can be realized by improving the software while a configuration of the hardware is maintained to be like conventional art, there is an advantage that no rise of production cost occurs. Therefore, additional value of the reproducing apparatus of the embodiment can be improved.

Further, in the reproducing apparatus of the embodiment, as described above, a particular tempo is detected from the difference value and the sound source generated by the sound source generating means is switched corresponding to the particular tempo. Thus, in strong beat music, a violent effect sound can be superimposed and on the contrary, in mild stream music, a soft effect sound can be superimposed.

Further, in the reproducing apparatus of the first embodiment, the sound source generated by the sound source generating means has a low sound and a high sound of the same tone. Thus, it is possible to superimpose a wide range of the effect sounds with the low sound and the high sound of the same tone.

Further, in the reproducing apparatus of the first embodiment, because the mask setting time is provided between the previous and present times according to whether or not the difference value is larger than a predetermined value, by setting the mask setting time so as to be relatively long when the difference value is large, a dynamic effect sound having a large impact like a stop motion can be superimposed. On the contrary, by setting the mask setting time so as to be relatively short when the difference value is small, a mild and smooth sound effect sound can be superimposed.

Further, in the reproducing apparatus of the second embodiment, because the tone of the sound source generated by the sound source generating means can be selected at random using the random number, as compared to a case in which a particular tone is superimposed, an effect sound not predictable can be superimposed.

According to the second embodiment, the characteristic of music can be recognized according to the difference value of the envelope value, and by activating an image corresponding to the recognized music, a change of music can be expressed in the form of animation, so that dynamism of music can be appealed to user strongly.

Consequently, demonstration effect at a retailer store can be improved. Further, because the present invention can be realized by improving the software while a configuration of the hardware is maintained to be like conventional art, there is an advantage that no rise of production cost occurs. Therefore, additional value of the display device of this embodiment can be improved.

Further, in the display device of the second embodiment, as described above, a particular tempo is detected from the difference value and a pattern displayed on the display unit 14 as the display means is switched corresponding to the particular tempo. Therefore, if a strong beat music is produced, a violent motion animation can be displayed, and if a mild music is produced, a soft motion animation can be displayed.

Further, in the display device of the second embodiment, a pattern displayed on the display unit 14 as a display means is repeated at a predetermined frequency. Thus, by repeating the pattern of an animation displayed at the frequency of a tempo appearing continuously in music, the characteristic of the music can be expressed by repeating of the animation.

Further, in the display device of the second embodiment, a mask setting time is provided between the previous and present times according to whether the difference value is larger or smaller than a predetermined value. Thus, by setting the mask setting time so as to be relatively long when the difference value is large, a dynamic animation motion having a large impact can be expressed just like a stop motion. On the contrary, by setting the mask setting time so as to be relatively short when the difference value is small, a mild and smooth animation motion can be expressed.

Further, in the display device of the second embodiment, the display unit 14 as the display means is so constructed as to be capable of selecting a case for displaying a pattern or a case for displaying spectrum corresponding to a sound range. Thus, the conventional spectrum analyzer display can be performed selectively as well as the animation display.

Further, according to the third embodiment, the characteristic (genre) of music can be recognized according to the difference value of the envelope value of a reproduced signal reproduced by the reproducing apparatus, and by superimposing a rhythm on the recognized music in accordance therewith, a change of music can be expressed by the superimposed rhythm, so that the dynamism of music can be appealed to the user strongly.

Consequently, demonstration effect at a retailer store can be improved. Further, because the present invention can be realized by improving the software while a configuration of the software is maintained to be like conventional art, there is an advantage that no rise of production cost occurs. Therefore, additional value of the reproducing apparatus of the embodiment can be improved.

Further, in the reproducing apparatus of the third embodiment, in the apparatus described above, the CPU 6 as the tempo measuring means obtains an interval between a previous time and a present time from the difference value and measures the tempo according to the interval. Therefore, by accumulating sound intervals integer times a reference interval, the tempo can be measured according thereto to thereby obtain the same kind of tempo.

Further, in the reproducing apparatus of the third embodiment, in the apparatus described above, the rhythm generator 18 as a rhythm sound source generating means generates a rhythm pattern at the tempo measured according to the interval. Therefore, in a strong beat music, a violent rhythm can be superimposed and on the contrary, in a mild stream music, a soft rhythm can be superimposed.

Further, in the reproducing apparatus of the third embodiment, in the apparatus described above, a mask setting time is provided between the previous time and the present time when the difference value is larger than a predetermined value. Therefore, by setting the mask setting time when the difference value is large, a dynamic superimposing rhythm having a large impact can be achieved just like a stop motion. On the contrary, by setting no mask setting time when the difference value is small, a mild and smooth superimposing rhythm can be achieved.

Further, in the reproducing apparatus of the third embodiment, in the apparatus described above, a deviation in time relative to the tempo for generation of a rhythm pattern in the rhythm generator 18 as a rhythm sound source generating means is corrected. Therefore, even if the interval of a reproduced sound deviates, by correcting the deviation by synchronization of the rhythm so as to generate a rhythm corresponding to this corrected tempo, the rhythm can be superimposed on the reproduced sound in synchronism therewith.

According to the fourth embodiment of the present invention, the characteristic of music can be recognized according to the difference value of the envelope value, and by controlling the sound field of music corresponding to the recognized music, a change of music can be expressed by sound field control, so that dynamism of music can be appealed to the user strongly.

Consequently, demonstration effect at a retailer store can be improved. Further, because the apparatus can be realized by improving the software while a configuration of the software is maintained to be like conventional art, there is an advantage that no rise of production cost occurs. Therefore, additional value of the reproducing apparatus of the embodiment can be improved.

Further, in the reproducing apparatus of the fourth embodiment, the CPU 6 as the tempo measuring means obtains an interval between a previous time and a present time from the difference value and measures the tempo according to the interval. Therefore, by accumulating sound intervals integer times the reference interval, the tempo can be measured according thereto so as to obtain the same kind of tempo and hence the sound field of reproduced music can be controlled.

Further, in the reproducing apparatus of the fourth embodiment, in the apparatus described above, the CPU 6 as a cyclic property detecting means obtains an interval between a previous time and a present time from the difference value so as to detect the cyclic property based on the interval. Thus, by detecting a cyclic pattern acting as a reference and then detecting a same pattern as this reference cyclic pattern, the cyclic property of music can be obtained, so that the sound field of music to be reproduced can be controlled according to a difference of the cyclic property detected.

Further, the reproducing apparatus of the fourth embodiment, in the apparatus described above, there is provided a CPU 6 as a music determining means for d determining the kind of music of the audio signal based on the tempo information from the CPU 6 as the tempo measuring means and the cyclic property information from the CPU 6 as the cyclic property detecting means, in which the control on the sound field corresponding to the audio signal in the sound source DSP 19 as the sound field control means is changed according to the kind of music determined by the music determining means. Thus, for a music having a strong beat or a music which goes round having a quick reference cyclic pattern, the sound field can be controlled so as to be violent. On the contrary, for a music having a mild stream or a music which goes round at a slow reference cyclic pattern, the sound field can be controlled d so as to be soft.

Further, in the reproducing of the fourth embodiment, in the apparatus described above, the sound source DSP 19 as the sound field controlling means is a graphic equalizer and the sound field for the audio signal in the graphic equalizer is controlled according to the kind of music determined by the music determining means. Thus, by making the frequency characteristic variable by the graphic equalizer according to the kind or melody of music, the so un d field of the music can be controlled by using various patterns. Further, the sound field controlling means may add a sound field effect by surround or add a sound field effect of a concert hall, theater or the like famous in excellent sound effect.

The present invention is capable of providing a reproducing apparatus including all the configurations of the first embodiment to fourth embodiment or a reproducing apparatus provided with various combinations thereof.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A reproducing apparatus comprising:

a band dividing means for dividing an input audio signal to a plurality of bands;

an envelope detecting means for detecting an envelope value at every band divided by said band dividing means;

a first memory means for holding the envelope value detected by said envelope detecting means at every band;

a second memory means for holding the envelope value stored in said first memory means by shift in time series;

an operation means for calculating a difference value between a present envelope value stored in said first memory means and a previous envelope value stored by said second memory means;

a sound source generating means for generating a plurality of effect sounds; and a sound source generation control means for switching a sound source generated by said sound source generating means based on the difference value calculated by said operation means.

2. The reproducing apparatus according to claim 1, further comprising a tempo measuring means for detecting a particular tempo based on the difference value calculated by said operation means and wherein the sound source generation control means and source generated by said sound source generating means based on a tempo detected by said tempo detecting means.

3. The reproducing apparatus according to claim 1, wherein said sound source generation control means includes a comparing means for comparing whether or not said difference value is larger than a predetermined value and a mask time setting means for setting a first mask time when it is determined that said difference value is larger than a predetermined value by said comparing means and for setting a second mask time which is shorter than the first mask time when it is determined that said difference value is smaller than the predetermined value by said comparing means, a masking period set by said mask time setting means being controlled not so as to switch the sound source.

4. The reproducing apparatus according to claim 1, wherein a tone of a sound source generated by said sound source generating means is switched according to a random number.

* * * * *